United States Patent [19]

Fisher

[11] Patent Number: 5,276,975
[45] Date of Patent: Jan. 11, 1994

[54] AUDIBLE-VISUAL EDGE FINDER

[76] Inventor: John F. Fisher, 6011 Boeing Pl., Los Angeles, Calif. 90045

[21] Appl. No.: 8,642

[22] Filed: Jan. 25, 1993

[51] Int. Cl.⁵ .................. B23Q 17/22; G01B 5/25
[52] U.S. Cl. .......................... 33/642; 33/626; 33/630
[58] Field of Search .............. 33/626, 628, 630, 638, 33/642, 644, 832; 409/218

[56] References Cited

U.S. PATENT DOCUMENTS

| | | | |
|---|---|---|---|
| 1,984,864 | 12/1934 | Cole et al. | 33/642 |
| 2,994,131 | 8/1961 | Gaylord | 33/642 |
| 3,999,299 | 12/1976 | Johnson | 33/642 X |

Primary Examiner—William A. Cuchlinski, Jr.
Assistant Examiner—Alvin Wirthlin
Attorney, Agent, or Firm—John T. Matlago

[57] ABSTRACT

An edge finder held on the end of a spindle of a milling machine is provided with a flat on the outer cylindrical surface of the working end member thereof. When the edge of a work piece mounted on the table of the milling machine is slowly advanced by a machinist to contact the rotating end member, the flat thereon produces an audible clicking sound each revolution of the spindle. Moreover, upon contact, the flat on the rotating working end member causes it to vibrate radially thereby enhancing the sidewise jump thereof and making it easier for the jump to be observed by the machinist.

11 Claims, 1 Drawing Sheet

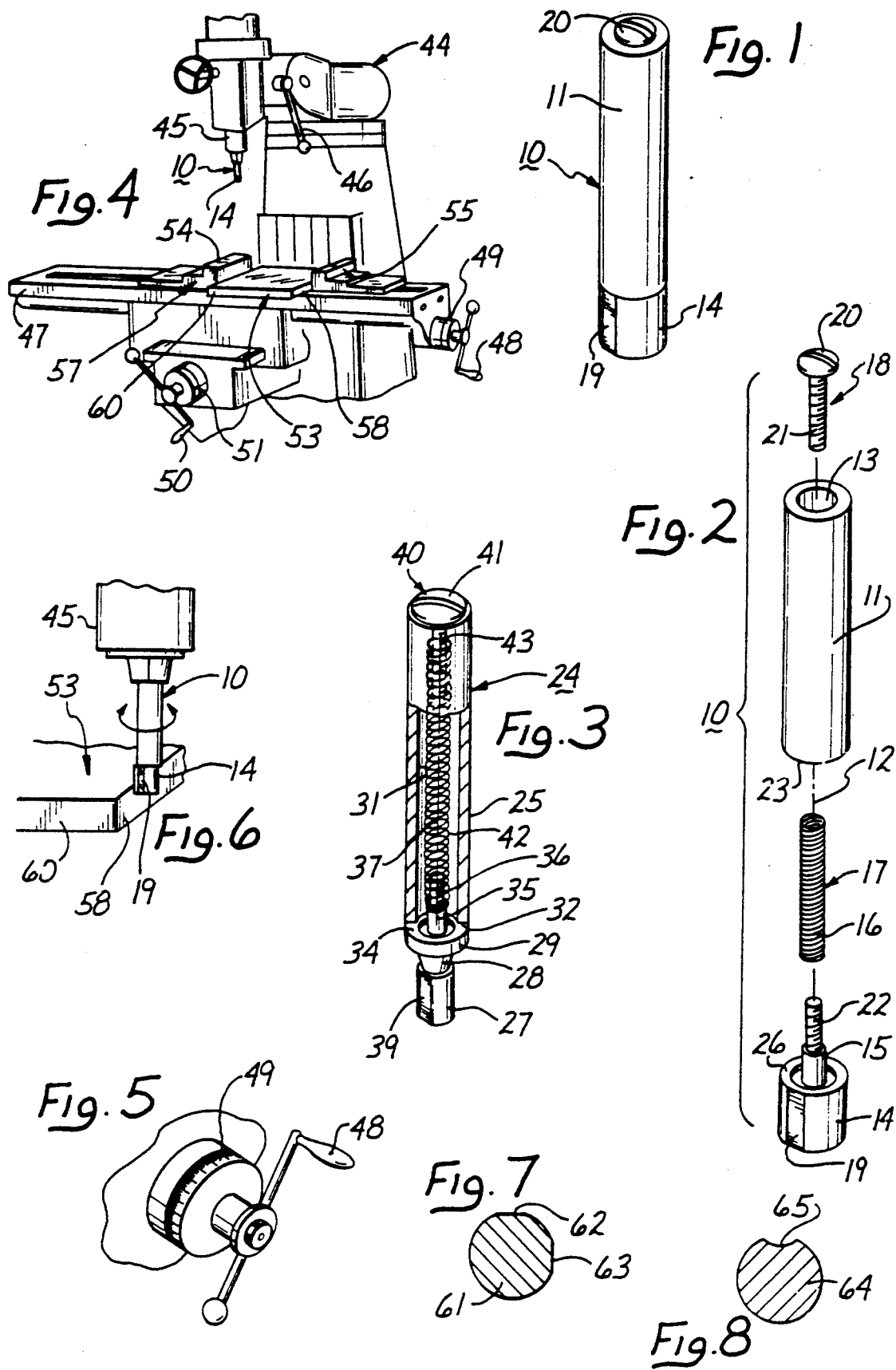

AUDIBLE-VISUAL EDGE FINDER

This invention relates to improvements in edge finders for use on end rotary cutting machines and more particularly to an edge finder that is mounted in the spindle of an end milling machine and provides both an audible and a visual signal when the working end member thereof is contacted by the edge of a work piece.

DESCRIPTION OF THE PRIOR ART

A rotary edge finder typically comprises an elongated cylindrical shank provided with a short cylindrical working end member on the bottom thereof. The cylindrical shank is provided with a central opening therethrough. The working end member is provided with a central post on the top surface thereof. The post is threaded to receive the coils forming the lower end portion of a spring. A screw having its head seated in the central opening on the top of the elongated cylindrical shank has its threaded end engaged within the coils forming the upper end portion of the spring. Rotating the head of the screw advances its threaded end within the coils of the spring to provide for resiliently holding the top surface of the working end member up against the bottom surface of the cylindrical shank so as to have a slidable contact therewith. The edge finder is used to set the dials of manually rotated handles that are provide on an end milling machine to move the table thereof, and therefore a work place mounted thereon, in a longitudinal and transverse direction relative to the spindle. Thus, to set the dials, the elongated cylindrical shank of the edge finder is mounted in the end of the spindle of the end milling machine. The table is then advanced in the longitudinal direction by the machinist rotating the handle connected to the longitudinal reading dial such that the transverse edge of the work piece slowly approaches the working end member of the rotating edge finder. When the transverse edge of the work piece contacts the rotating working end member, the latter jumps sideways as result of the frictional contact therewith. That is, the working end member moves off-center from the axis of the cylindrical shank by approximately 1/32 of an inch. The machinist, upon observing the jump, shifts his eyes to observe the reading on the dial which is marked with graduations, each corresponding to one-thousandths of an inch. He then reverses the direction of rotation of the handle, and thus the dial, such that the edge finder is moved away from the transverse edge of the work piece. The machinist then again, keeping in mind the first reading of the dial, more slowly advances the table toward the edge finder on the rotating spindle until the rotating working end member thereon again jumps sidewise when contacted by the transverse edge of the work piece. The machinist upon observing the jump again observes the reading of the dial which is more accurate than the first reading. The machinist then goes through this routine one more time to further refine the reading on the dial at the instant the working end member jumps. The machinist then corrects the dial reading by advancing the dial by rotating the handle thereof by an amount corresponding to the radius of the edge finder, and then finally resets the dial reading to zero. The machinist, in the same manner, by using the handle and dial for controlling the transverse movement of the table, advances the longitudinal edge of the work piece mounted thereon towards the edge finder and observes the jump of the working end member thereof when contact is made and then reads the dial as before described. The machinist then goes through this routine two more times, as previously described, to refine the dial reading and then corrects the reading on the dial by the radius of the edge finder before he finally resets the dial reading for the transverse movement to zero.

It should be noted that in the prior art, the determination of when the working end member of the edge finder has contacted the edge of the work piece is made by the machinist first visually observing the off-center sideway jump of the working end member of the edge finder followed by the shifting of his eyes to read the dial. There are occasions when a machinist finds it cumbersome to visually detect the single short sideways jump of the working end member on the edge finder. The reasons for not being able to observe the jump may be because of poor eyesight, poor lighting conditions, the the presence of glare, or because of the nature of the set up of the work piece on the table. This prolongs the time it takes for the machinist to set the dials and may even require that he get assistance.

SUMMARY OF THE INVENTION

The present invention solves the problem encountered when using the above described prior art edge finder by providing an axially aligned discontinuity, such as a flat, on the outer cylindrical surface of the working end member of the edge finder. This flat produces a clicking sound once each revolution of the spindle once the working end member jumps sideway as a result of being contacted by the edge of the work piece. Thus, the machinist can choose not to observe the jump of the end member, if it is not convenient to do so, and can instead keep his eyes focused on the dial and listen for the clicks of the working end member when it jumps, and thereby obtain the reading corresponding to the jump. It should be noted, moreover, that the presence of the flat on the working end member actually enhances the jump thereof by creating a small radial vibration on the working end member which doubles the distance of the jump of prior art edge finders to about 1/16 of an inch and therefore makes it easier for the jump to be observed. Thus, the signals made available by the edge finder of the present invention to enable the machinist to detect when the contact is made between the edge of the work piece and the working end member of the edge finder is not only including an audible signal but is also including an enhanced visual signal. That is, the machinist now has an audible-visual edge finder at his disposal.

Accordingly, an object of the present invention is to provide an edge finder for use in the rotating spindle of an end milling machine that has an working end member with an axially aligned discontinuity on the outer cylindrical surface thereof that produces an audible clicking sound when the end member jumps upon being contacted by the edge of a work piece being advanced toward it.

Another object of the present invention is to provide an edge finder for use in the rotating spindle of an end milling machine that has a working end member with an axially aligned discontinuity on the cylindrical surface thereof that not only produces audible clicks when the end member jumps upon being contacted by the edge of a work piece being advanced toward it but also serves to enhance the jump of the working end member and thus makes it easier for the jump to be visually observed.

Other objects and advantages of the invention will become apparent from the following description when read in conjunction with the accompanying drawings.

BRIEF DESCRIPTION OF THE DRAWINGS

FIG. 1 is a perspective view of the edge finder of the present invention;

FIG. 2 is an exploded elevational view of the edge finder shown in FIG. 1;

FIG. 3 is a perspective, partially sectional, view of another embodiment of the edge finder of the present invention;

FIG. 4 is a partially broken away perspective view of an end milling machine provided with the edge finder of the present invention inserted in the spindle thereof;

FIG. 5 is a perspective view of a typical rotating handle and dial as used to manually advance the table of an end milling machine;

FIG. 6 is a view showing the working end member on the edge finder in its jumped position as a result of being contacted by the edge of the work piece being advanced toward it; and FIGS. 7 and 8 show alternate cross sectional views of a working end member for the edge finder of the present invention with other forms of axially aligned discontinuities provided on the outer cylindrical surface thereof.

DESCRIPTION OF THE PREFERRED EMBODIMENT

Referring to FIG. 1, the edge finder 10 of the present invention is comprised of a cylindrical shank 11 having a short cylindrical working end member 14 on the bottom thereof. The end member 14 is provided with an axially aligned flat 19 that is typically 1/8 to 3/32 wide and extends from the top to the bottom of the outer cylindrical surface thereof. As shown by an exploded elevational view of the edge finder 10 in FIG. 2, the cylindrical shank 11 has a central circular opening 13 therethrough. The cylindrical working end member 14 is formed with an axially aligned integral post 15 on the top thereof. The upper portion of post 15 is provided with threads 22 to engage within coils 16 on the lower portion of a spring 17. A screw 18 has its head 20 seated on the top of the opening 13 of the cylindrical shank 11 and the bottom end portion of its threads 21 engaged within coils 16 on the upper portion of spring 17. It should now be clear that rotating the head 20 of the screw 18 advances its threaded end into the coils 16 of the spring 17 so that the top annular flat surface 26 of the cylindrical end member 14 is resiliently held up against the bottom flat annular surface 23 of the elongated cylindrical shank 11 to have a slidable contact therewith.

It should be appreciated that the outer cylindrical surfaces of both the shank 11 and the working end member 14 of the edge finder 10 are initially formed to be oversized by 0.010 of an inch of their true size, and then hardened all over. These parts are then precisely ground so that they are within ± 0.0001 of an inch of their true size, e.g. 0.5000 of an inch in diameter. Moreover, the bottom flat annular surface 23 of the cylindrical shank 11 and the top flat annular surface 26 of the working end member 14 are ground so as to be normal to the longitudinal axis 12 of the cylindrical shank 11 within ± 0.0001 of an inch. The end member 14 is then preferably dipped into a chemical solution which, as well known in the art, provides for penetrating the surface thereof so as to coat it with a black oxide. It is after the end member 14 is hardened and the surface is coated with the black oxide that the flat 19 is ground on the outer cylindrical surface thereof. As previously mentioned, the dimensions of the flat are not critical. The black oxide coating on the outer cylindrical surface of the end member 14, except for the flat 19, provides a contrast that helps the machinist to observe the jump.

FIG. 3 shows an embodiment of a step edge finder 24 in accordance with the teachings of the present invention. The step edge finder 24 is comprised of a cylindrical shank 25 and a short cylindrical working end member 27 having a disk 29 connected on the upper end thereof by an integral neck 28. The cylindrical shank 25 has a central circular opening 31 therethrough which extends from the top to the bottom thereof and forms a annular flat surface 32 on the bottom thereof. The disk 29 has a top flat annular surface 34 with a central post 35 extending upwardly therefrom. The cylindrical shank 25 and the disk 29 are both ground to have the same size diameter, e.g. 0.375 inch, and both the bottom flat annular surface 32 of the shank 25 and the top flat annular surface 34 of the disk 29 are ground to within 0.0001 of an inch of being normal to the longitudinal axis 37 of the edge finder 24. The outer cylindrical surface of the end member 27 is precisely ground so that it is 0.2000 inch in diameter within ± 0.0001 of an inch and so that the diameter thereof is normal to the axis 37 of the edge finder 24 to within ± 0.0001 of an inch. The working end member 27 has an axially aligned flat 39 ground to the outer cylindrical surface thereof which is ⅛ to 3/32 of an inch wide and extends from the top to the bottom surface of the edge member 27. The dimensions of the flat 39 are obviously not critical. A screw 40 has its head 41 seated on the top surface of the circular central opening 31 and, similarly to that shown in FIG. 2, the threads 43 on the end of the screw 40 are connected by a coiled spring 42 to threads 36 of post 35 on the top of the disk 29 so that the top flat annular surface 34 on the disk 29 is held up against the bottom flat annular surface 32 of the shank 25 so as to have a slidable contact therewith.

Referring next to FIG. 4, there is illustrated an example of the environment in which the present invention can be used. Thus, FIG. 4 shows a portion of an end milling machine 44 having a spindle 45 in the end of which the shank 11 of the edge finder 10, shown in FIG. 1, is inserted. A table 47 on the end milling machine 44 is movable longitudinally by a manually rotatable handle 48 provided with a dial 49. As shown in FIG. 5, dial 49 is typically provided with 200 graduation marks around the periphery thereof, each mark corresponding to one thousandths of an inch of the longitudinal travel of the table 47. As shown in FIG. 4, the table 47 is also movable transversely by a manually rotatable handle 50 provided with a dial 51 identical to dial 49.

As shown in FIG. 4, a work piece 53 is mounted between the jaws 54 and 55 of a precision vice 57 mounted on the table 47, such that the transverse edge 58 thereof extends forwardly of the jaws 54 and 55. The machinist then positions the table 47 by rotating the handle 48 so that the transverse edge 58 of the work piece 53 is to the left of the rotating edge finder 10 in the spindle 45. The spindle 45 with the edge finder 10 inserted therein is then lowered by lever 46 so that the end member 14 of the latter is spaced oppositely the extended transverse edge 58 of the work piece 53. The machinist then manually rotates the handle 48 in a direction to longitudinally advance the table 47, and thus the transverse edge 58 of the work piece 53, toward the rotating end member 14. When the transverse edge 58 of the work piece 53 contacts the rotating working end member 14, friction causes the working end member 14 to jump sideways about 1/16 of an inch off-center of the spindle 45, as shown in FIG. 6. It should be especially noted that the direction of the rotation of the spindle 45, and therefore, the cylindrical surface of the end member 14 of the edge finder 10, is opposite to the direction of the sideways movement or jump of the working end member 14. It is because of the flat 19 on the cylindrical surface of the end member 14 that the audible click is produced each time the flat 19 rotates past the transverse edge 58 of the work piece 53. It should be also noted that the presence of the flat 19 causes the end member 14 to slightly move in and out, i.e., vibrate radially, as it rotates. This serves to break the initial bonding between the bottom annular flat surface of the shank 11 and the top annular flat surface of the end member 14 and thus enhances the sideways jump of the latter so that it is not only twice the distance of the jump provided in the prior art edge finders but it is quicker and sharper and is therefore easier to observe.

When the machinist observes this enhanced jump and/or hears the clicking sound, he also observes the reading of the dial 49. As with prior art edge finders, the machinist then backs up the dial 49, and, therefore, the table 47, by manually rotating the handle 48 in its opposite direction. He then rotates the handle 48 in the direction to move the table 47 so that the transverse edge 58 of the work piece 53 mounted thereon again approaches the working end member 14 on the rotating edge finder 10 and, upon contact, the friction caused the working end member 14 to again jump sideways off-center. The machinist upon visually observing when the working end member 14 jumps and/or upon hearing the audible clicking caused by the flat 19, again reads the dial 49 so as to obtain a more refined reading thereon. As in the prior art, this routine is carried out one more time so as to still further refine the reading of the dial to its true reading. The machinist then corrects the setting of the dial 49 by taking into account the radius of the working end member 14, which is 0.250 of an inch, by rotating the dial 30 one and one-quarter turns and then resetting the dial 49 to zero.

It should now be clear that the reason that the working end member 14 of the edge finder 10 is precisely ground to 0.5000 of an inch is to eliminate unnecessary calculations by placing the axis of the spindle 45, so that it is precisely located 0.2500 of an inch from the edge of the work piece 53, when the edge of the work piece contacts the end member 14. Thus, the size of the diameter of the end member 14 is chosen so that its radius can be readily added to the reading of the dial 49 by rotating the latter by one and a quarter turns, for example.

The machinist by using lever 46 to raise the spindle 45, then positions the table 47 so that the front longitudinal edge 60 of the work piece 53 is located to the rear of the working end member 14. He then lowers the spindle 45 using lever 46 until the working end member 14 of the edge finder 10 held in the spindle 45 is just opposite the longitudinal edge 60 of the work piece 53. The machinist then, in the same manner, as previously described for locating the transverse edge 58 of the work piece 53, obtains the reading of the dial 51 when the longitudinal edge 60 of the work piece 53 is advanced to contact the end member 14 of the edge finder 10.

It should now be appreciated that the presence of the flat 19 on the cylindrical surface of the working end member 14 of edge finder 10 is highly useful in that it enables an audible click to be produced each revolution of the spindle 45 to let the machinist know that the side of the work piece 53 has contacted the working end member 14 without the need of having to observe the jump of the working end member 14. This enables him to focus his eyes only on the dial reading and listen for the audible clicks to let him know when the contact has been made and the jump has occurred. Moreover, the flat 19 on the cylindrical surface of the working end member 14 causes a slight radial vibration on the end member 14 which doubles the jump thereof to about 1/16 of an inch and makes it easier to be observed, if the machinist chooses to observe the jump.

The machinist now having aligned the dials 49 and 51 for the respective longitudinal and transverse movements of the work piece 53 replaces the edge finder 10 in the spindle 45 with a drill (not shown). Then, by observing the reading on the dials 49 or 51, as he rotates either of the handles 48 or 49 associated with each, he can position any point on the surface of the work piece 53 so that it is aligned with the axis of the spindle 45. This enables holes to be drilled by the drill held in the spindle at points corresponding to their specified locations on a layout.

Reference will next be made to FIGS. 7 and 8 which show cross sectional views of alternate forms of axially aligned discontinuties that can be provided on the circumferential surface of a working end member of an edge finder. Thus, FIG. 7 shows that the axial aligned discontinuity, provided on the circumferential surface of a working end member 61, which is similar to the end working end member 14 in FIG. 2, can be formed by providing two flats 62 and 63 that are spaced apart from each other by 90 degrees, for example. FIG. 8, shows that the axially aligned discontinuity on a cylindrical surface of a working end member 64 of an edge finder can have the shape of a concave surface 65 as formed by a rotary grinder, for example. It should now be clear that more than one axially aligned discontinuity can be provided about the cylindrical surface of a working end member of an edge finder and these discontinuities need not be equally spaced from each other nor do they necessarily need to be flat surfaces. Moreover, although a wide range of widths or placements of one or more discontinuities such as flats or concave surfaces can be provided on the cylindrical surface of a working end member to serve the purpose of producing a clicking sound each revolution of the spindle, a single axially aligned discontinuity in the form of either a flat or a concave surface is preferred because it reduces the expense of grinding the discontinuity on the hardened end member 46. The edge finder is a low cost tool and consequently it is desirable to keep the manufacture cost as low as possible. The advantage of providing more than one discontinuity about the cylindrical surface of the end member 46 is that the clicking sound occurs more frequently.

Still another advantage of the present invention is that it is an extremely economical improvement in that edge finders are already being manufactured with cylindrical working end members which jump sideways when the edge of a work piece frictionally makes contact therewith. The only added expense involves the formation of the working end member with a flat or other forms of axially aligned discontinuity on the cylindrical surface thereof.

While the invention has been concerned with particular embodiments of the invention, it is to be understood that many modifications and variations in the construction and arrangement thereof may be provided for without departing from the spirit and scope of the invention or sacrificing any of its advantages. The invention is therefore considered as including all such possible modifications and variations coming within the legitimate and valid scope of the claims.

What is claimed is:

1. An audible-visual edge finder for mounting on the end of a spindle of a rotary cutting machine provided with a table having a work piece mounted thereon, said edge finder comprising:
   a cylindrical shank having an axial opening therethrough and having a flat bottom annular surface which is normal to the axial opening;
   a working end member provided with a cylindrical surface having an axis and having a flat top annular surface that is normal to the axis thereof, and a bottom surface;
   means for producing a clicking sound, including an axially aligned discontinuity formed on the cylindrical surface of said working end member; and
   means including a spring extending through the axial opening in the cylindrical shank for resiliently holding the flat top annular surface of said working end member up against the flat bottom annular surface of said cylindrical shank so as to have a slidable contact therewith;
   whereby when an edge of the work piece mounted on the table of the rotary cutting machine is advanced to contact the cylindrical surface of the working end member, the latter jumps sideways and causes the discontinuity on the cylindrical surface of the working end member to produce a clicking sound each revolution of the spindle.

2. An edge finder as claimed in claim 1 wherein the cylindrical surface of said working end member has throughout its length a diameter of the same size as the cylindrical shank and wherein said axially aligned discontinuity extends from the top to the bottom thereof.

3. An edge finder as claimed in claim 1 wherein the cylindrical surface of said working end member comprises an upper cylindrical surface portion having a diameter of the same size as the cylindrical shank and a lower cylindrical surface portion having a diameter smaller than the diameter of the cylindrical shank, and wherein said axially aligned discontinuity is formed on the lower cylindrical surface portion.

4. An audible-visual edge finder as claimed in claim 1 wherein the axially aligned discontinuity provided on the cylindrical surface of said working end member is in the form of a flat.

5. An audible-visual edge finder as claimed in claim 4 wherein said flat is on the order of 1/8 to 3/32 of an inch in width.

6. An audible-visual edge finder as claimed in claim 1 wherein the axially aligned discontinuity provided on the cylindrical surface of said working end member is in the form of a concave curve.

7. An audible-visual edge finder as claimed in claim 1 wherein the axially aligned discontinuity provided on the cylindrical surface of said working end member comprises a plurality of flats spaced thereabout.

8. An audible-visual edge finder as claimed in claim 1 wherein the axially aligned discontinuity provided on the cylindrical surface of said working end member is structured to cause said working end member to vibrate radially and thereby maximizes the jump thereof and further causes the jump to be more sharply defined thereby making it easier to be visually observed.

9. An audible-visual edge finder as claimed in claim 1 wherein the cylindrical surface of said working end member has a coating of black oxide thereon except where the discontinuity is formed thereon.

10. An audible-visual edge finder for mounting on the end of a spindle of a rotary cutting machine provided with a table having a work piece mounted thereon, said edge finder comprising:
    a cylindrical shank having an axial opening therethrough and having a flat bottom annular surface which is normal to the axial opening;
    a working end member provided with a cylindrical surface having an axis and having a flat top annular surface that is normal to the axis thereof, and a bottom surface;
    means for producing a clicking sound, including an axially aligned discontinuity formed on the cylindrical surface of said end member; and
    means including a spring for resiliently holding the flat top annular surface of said working end member up against the flat bottom annular surface of said cylindrical shank so as to have a slidable contact therewith;
    whereby when an edge of the work piece mounted on the table of the rotary cutting machine is advanced to contact the cylindrical surface of the working end member, the latter jumps sideways and causes the discontinuity on the outer cylindrical surface of the working end member to produce a clicking sound each revolution of the spindle.

11. An audible-visual edge finder for mounting on the end of a spindle of a rotary cutting machine provided with a table having a work piece mounted thereon, said edge finder comprising:
    a cylindrical shank having an axial opening therethrough and having a flat bottom annular surface which is normal to the axial opening;
    a cylindrical working end member provided with an axis and an upper outer cylindrical surface portion having the same diameter as the cylindrical shank and a lower outer cylindrical surface portion having a smaller diameter then said upper outer cylindrical surface portion;
    said upper outer cylindrical surface portion on said working end member having a flat top annular surface which is normal to the axis thereof;
    means for producing a clicking sound, including an axially aligned discontinuity on the lower outer cylindrical surface portion of said working end member; and
    means including a spring for resiliently holding the flat top annular surface on the upper outer cylindrical surface portion of the working end member up against the flat bottom annular surface of said cylindrical shank so as to have a slidable contact therewith;
    whereby when an edge of the work piece mounted on the table of the rotary cutting machine is advanced to contact the lower cylindrical outer surface portion of said working end member, the latter jumps sideways and causes the discontinuity thereon to produce a clicking sound each revolution of the spindle.

* * * * *